Dec. 26, 1939.　　R. B. STODDARD　　2,185,003
VEHICLE BRAKING MEANS
Filed Nov. 14, 1938　　3 Sheets-Sheet 1

Inventor
Russell B. Stoddard
By Rockwell & Bartholow
Attorneys

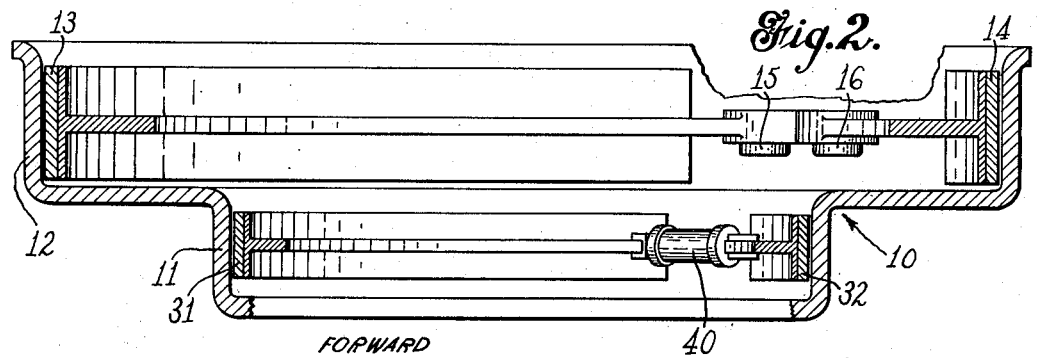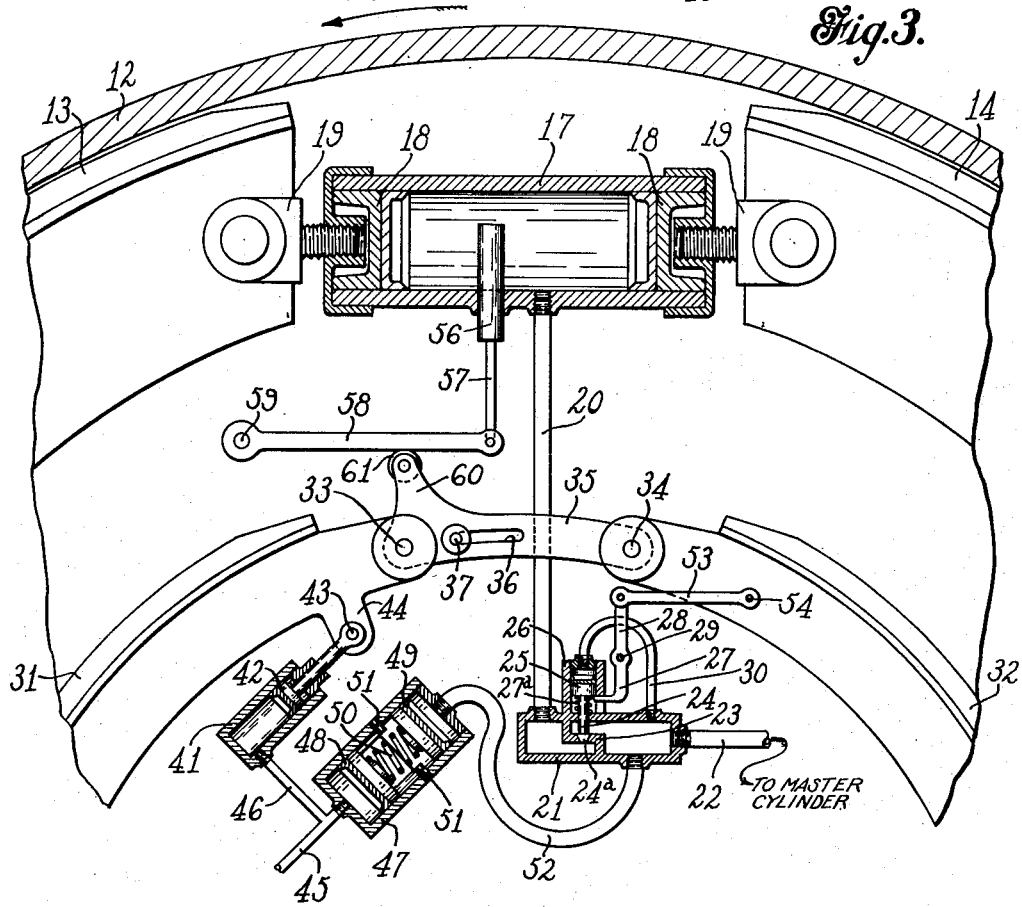

Dec. 26, 1939.  R. B. STODDARD  2,185,003
VEHICLE BRAKING MEANS
Filed Nov. 14, 1938  3 Sheets—Sheet 3

Inventor
Russell B. Stoddard
By Rockwell & Bartholow
Attorneys

Patented Dec. 26, 1939

2,185,003

UNITED STATES PATENT OFFICE 2,185,003

VEHICLE BRAKING MEANS

Russell B. Stoddard, Woodbridge, Conn.

Application November 14, 1938, Serial No. 240,215

20 Claims. (Cl. 188—181)

This invention relates to vehicle brakes, and more particularly to braking means for the wheels of vehicles operable at relatively high speeds, such as an automobile, for example, or the landing wheels of aircraft, and the invention may also have other applications which will appear from the following description.

In bringing a moving vehicle to a stop there are two kinds of friction to be considered, namely, static and kinetic. Of these the greater force is that of static friction, and it is, therefore, important, in order to bring a vehicle to a stop in the shortest possible time, to secure static friction between the wheel treads and the road surface. Static friction is present when the wheels are turning with relation to the road, so that in applying the vehicle brakes the greatest braking effect is secured when the wheels are turning rather than when the wheels are locked and sliding upon the surface of the road. In addition, it is of course desirable to prevent the tires from sliding, as there is danger of skidding, with consequent loss of control, and which also causes excessive wear upon the tire itself. Therefore, the most effective braking occurs when the brakes apply sufficient force to the wheels to slow them down to the stopping point, but insufficient to lock them against rotation.

One object of the present invention is the provision of a braking means for vehicle wheels by which the maximum braking effort may be applied to bring the vehicle to a stop.

A further object of the invention is the provision of a braking means for vehicle wheels such that the application of the brake will be so controlled that the wheel will not be locked against rotation, but at the same time the maximum braking effort will be applied to bring the wheel to the stopping point.

A still further object of the invention is the provision of a braking mechanism for vehicle wheels so arranged that, while any desired braking force may be applied to the wheel, if the wheel ceases to rotate, the braking force will be relieved and rotation of the wheel maintained, whereby the vehicle will be brought to a stop in the shortest possible time.

A still further object of the invention is the provision of a braking mechanism for vehicle wheels which will be so arranged that the maximum braking effect may be controlled by the deceleration of rotation of the vehicle wheel, whereby just prior to the cessation of such rotation the braking pressure will be relieved and the wheel prevented from sliding upon the surface upon which it moves.

To these and other ends the invention consists in the novel features and combinations of parts to be hereinafter described and claimed.

In the accompanying drawings:

Fig. 2 is a sectional view on line 2—2 of Fig. 1;

Fig. 3 is an enlarged fragmentary view similar to Fig. 1, showing certain parts of the mechanism in section;

Figure 1:
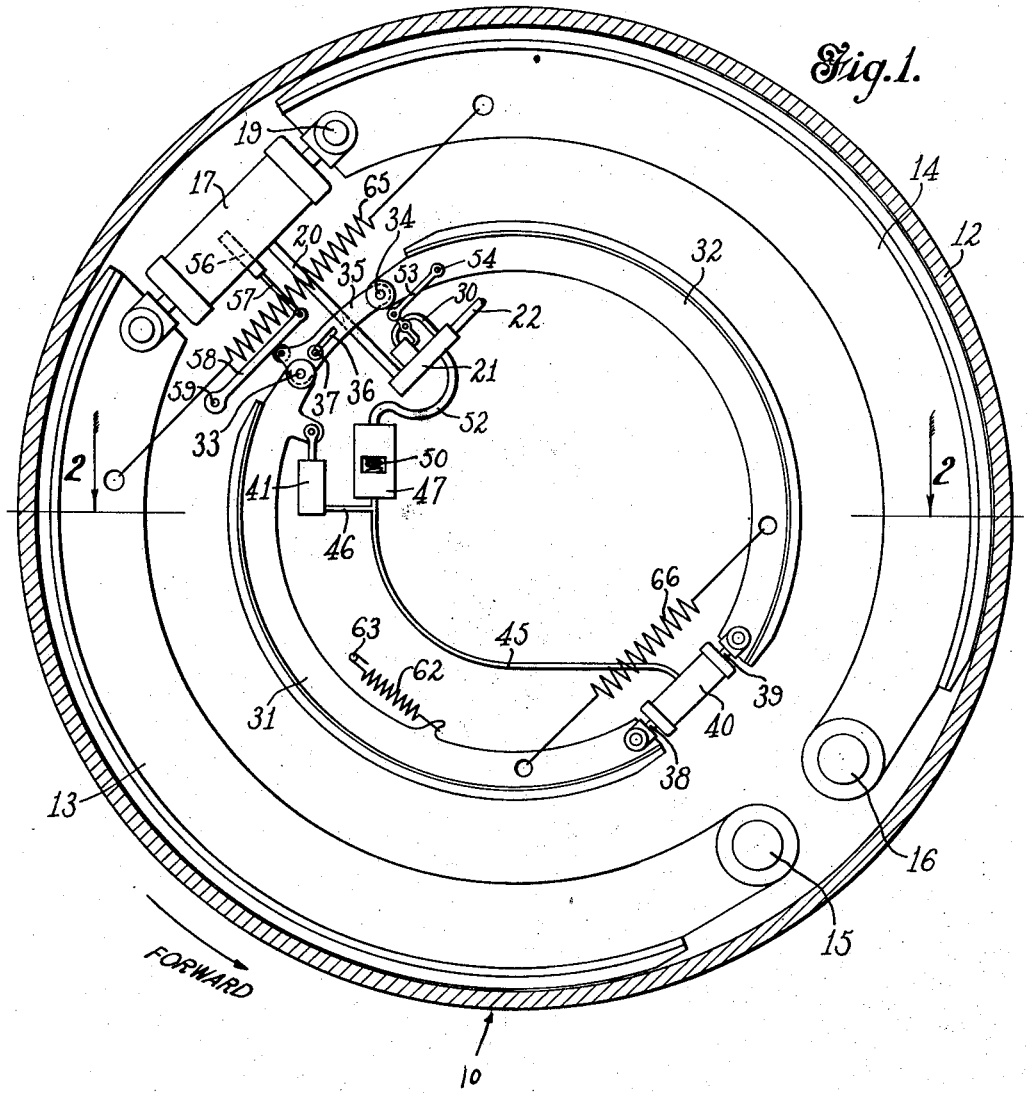
Fig. 1 is a side elevational view of the brake drum of a vehicle wheel to which my invention has been applied.

To illustrate one form of my invention I have shown in Figs. 1 and 2 of the drawings a brake drum 10 which may be secured upon the inner side of a vehicle wheel in a well-known manner. This brake drum comprises two independent annular friction surfaces 11 and 12, the surface 11 being of smaller diameter than the surface 12, and the latter corresponding to the usual vehicle brake drum upon which the brake pressure is applied. It will be understood that the friction or working surfaces of these parts of the drum are the inner surfaces thereof.

Mounted within and in cooperative relation with the drum part 12 are a pair of brake shoes 13 and 14, which may be of the usual form, these shoes being pivoted at 15 and 16, and adapted to be expanded at their opposite ends into contact with the inner surface of the drum part 12 to exert the usual braking effect upon the wheels.

As shown, the brakes are of the hydraulic type and are expanded by means of a pressure fluid within the cylinder 17, this pressure fluid acting upon the plungers 18 to move the shoes outwardly by means of the connections 19 to the bands 13 and 14. This pressure fluid is admitted to the cylinder 17 through a duct 20 leading to a valve casing 21, which valve casing is supplied with pressure fluid through the tube or duct 22 adapted to lead to the master cylinder (not shown), which may be of usual form and controlled by the usual brake pedal (not shown).

The casing 21 is provided with a partition 23 having a valve opening 24ᵃ therein, which opening permits communication between the ducts 20 and 22. This opening is controlled by a valve 24 at the lower end of a piston 25 reciprocably mounted in a cylinder 26, which may be disposed upon the wall of the valve casing 21. A spring 27ᵃ normally urges the valve upwardly so that the port 24ᵃ is normally open, and the piston is also positively held in an upper position by a latch 27 provided at the lower end of a lever 28 which is pivoted at 29. A tube 30 serves to provide communication between the entrance end of the valve housing 21 and that portion of the cylinder 26 above the piston 25.

Suitably supported within the drum part 11 are a pair of friction members or shoes 31 and 32. These members are similar in many respects to the brake shoes 13 and 14 in that they are adapted to be expanded into contact with the inner surface of the drum part 11 to frictionally engage this surface. These members are pivoted at 33 and 34 to a link 35 provided with a slot 36 which receives a pin 37 provided upon a fixed part of the vehicle, whereby the shoes 31 and 32 may rotate with respect to the vehicle through a small arc, as permitted by the length of the slot 36.

The opposite ends of the shoes 31 and 32 are pivotally connected to plungers 38 and 39 working in a pressure fluid cylinder 40 in a manner similar to that previously described in connection with the brake shoes 13 and 14 and fluid cylinder 17. It will be understood that when the fluid in the cylinder 40 is placed under pressure, as will be hereinafter explained, the plungers 38 and 39 will be moved outwardly to expand the shoes 31 and 32 into frictional contact with the drum surface 11.

When the shoes 31 and 32 are in frictional contact with the drum surface 11, they will tend to turn with the wheel, and means are provided to resist this tendency. To effect this end, a cylinder 41 may be mounted upon a fixed part of the vehicle, and a plunger 42 movably mounted in this cylinder may be pivotally connected as at 43 with a lug 44 on the member 31. If fluid under pressure is maintained in the cylinder 41, any tendency of the shoes 31 and 32 to rotate will be resisted by the plunger 42, the amount of resistance depending upon the pressure within the cylinder 41.

The cylinders 40 and 41 are connected by ducts 45 and 46 with a cylinder 47 provided with plungers 48 and 49 between which is mounted a compression spring 50. Stops 51 may be provided in the cylinder to limit the inward movement of the plunger 49.

The space below the plunger 48 in the cylinder 47 is in communication with the ducts 45 and 46, while the space above the plunger 49 is in communication with the inlet side of the valve housing 21 through the duct 52, so that when pressure is admitted to the valve housing through the duct 22 by operation of the brake pedal, it will also be admitted to the cylinder 47 above the plunger 49. This plunger will exert a compressing force upon the spring 50, which will exert a corresponding pressure upon the plunger 48, which will in turn compress the fluid within the lower end of the cylinder 47, and through ducts 45 and 46 increase the pressure upon the fluid in the cylinders 40 and 41. It will be understood that the cylinders 40 and 41, together with the ducts 45 and 46 and lower portion of the cylinder 47, contain at all times a given quantity of fluid to which pressure is transmitted by the plunger 48.

It will be apparent that the pressure existing in the cylinders 40 and 41 is dependent upon the spring 50 when pressure is admitted to the cylinder 47 through the duct 52. The force exerted by this spring is so proportioned with respect to the friction between the shoes 31 and 32 and the drum part 11, and with respect to the resistive action of the plunger 42, that any movement of the shoes 31 and 32 will be prevented by the plunger 42, as long as the drum 10 connected to the vehicle wheel rotates at a given speed. It will be understood that the coefficient of kinetic friction varies inversely as the relative speed of the two parts which are in frictional contact. That is, when the drum 10 is moving at a relatively rapid rate, the friction between this drum and the shoes 31 and 32 will be relatively small. As the rotational speed of the drum decreases, this frictional force increases. Thus, as the rotational speed of the vehicle wheel gradually approaches zero, the friction will increase, although no greater expansive force is applied to the shoes 31 and 32 through the plungers in the cylinder 40. The pressure within the cylinder 41 is so regulated that when the angular velocity of the drum 10 becomes very small, or, in other words, when the vehicle wheel is about to stop, the friction between the shoes 31 and 32 and the drum part 11 will overcome the resistive force of the plunger 42, and the shoes 31 and 32 will rotate slightly with the wheel, as permitted by the slot 36.

Provision is made for taking advantage of this slight rotation of the shoes 31 and 32 to relieve the pressure upon the brake shoes 13 and 14, so that the deceleration of the wheel will be stopped before the wheel is caused to lock. To effect this end, the upper end of the latch lever 28 is pivoted to one end of the link 53, the other end of which is pivoted at 54 to the friction shoe 32. It will be apparent that when the member 32 moves to the left, as shown in Fig. 3, the upper end of the latch lever 28 will also be moved to the left, thus withdrawing the latch 27 from below the plunger 25, and causing the fluid pressure entering the cylinder 26 above the piston to close the port 24ᵃ, and cut off communication between the cylinder 17 and the duct 22 leading to the master cylinder, so that further pressure upon the brake pedal will have no effect.

This in itself would not cause any relief of pressure within the cylinder 17, but merely prevent any increase of pressure within this cylinder. In order to provide positive relief for the pressure within this cylinder, a plunger 56 is reciprocably mounted in a wall thereof, the plunger having a stem 57 pivoted to one end of a link 58, the other end of which may be pivoted at 59 to a fixed part of the vehicle. The link 35 between the friction shoes 31 and 32 is provided with an upstanding lug 60 having an anti-friction roller 61 in contact with the lower surface of the link 58. As the shoes 31 and 32 are moved in a counterclockwise direction, or to the left, as shown in Fig. 3, this roller will be caused to move in a direction away from the link 58, permitting the lever to drop about the pivot 59 and partially withdrawing the plunger 56 from the cylinder 17, which will serve to relieve the pressure therein, and therefore serve to contract the brake shoes 13 and 14 to a sufficient extent to slightly decrease the braking effect thereof.

When the pressure of the brake shoes 13 and 14 is relieved, the vehicle wheel will increase its speed of rotation, and thus decrease the friction between the drum surface 11 and the friction shoes 31 and 32. This friction being relieved, the shoes will be returned to their initial position by means of a spring 62 secured at one end to the member 31, and secured at the other end to a pin 63 upon a fixed part of the vehicle. When the shoes 31 and 32 have been returned to their initial position, which is the position shown in Figs. 1 and 3, the link 58 will again be moved upwardly to protract the plunger 56 into the cylinder 17 to increase the pressure therein and exert the full braking effect upon the wheel, if at this time the operator is still pressing upon the brake pedal so that pressure fluid will still be maintained above the piston 25 through the ducts 22 and 30. If this pressure becomes sufficient to stop, or nearly stop, the wheels, the friction shoes 31 and 32 will again be rotated and the pressure will again be relieved.

The operation of the device may now be briefly set forth. Referring to Figs. 1 and 3, for example, it will be understood that the wheel and drum secured thereto will be rotating in a counterclockwise direction, as viewed in those figures. The parts are therein shown when the vehicle is moving and the wheels are rotating free of the brakes. If now the operator desires to apply the brakes, the brake pedal is depressed in the usual manner, admitting pressure fluid from the master cylinder from the duct 22 to the valve housing 21, and through the port 24ª and duct 20 to the cylinder 17, thus setting the brake shoes 13 and 14 against the drum surface 12. At the same time pressure fluid will be admitted through the duct 52 to the upper end of cylinder 47 to depress the plunger 49 against the spring 50 as far as permitted by the stops 51. The pressure of this spring on the plunger 48 will produce a pressure in the fluid circuit comprised by the ducts 45 and 46 and cylinders 40 and 41. The pressure in the cylinder 40 will set the friction shoes 31 and 32 against the drum surface 11, which will tend to cause these members to turn with the wheel. This tendency will be resisted by the pressure developed in the cylinder 41 acting upon the plunger 42. As has already been explained, the coefficient of kinetic friction increases with a decrease in velocity, so that when the wheel has been slowed to approximately the point where rotation will cease, the friction of the members 31 and 32 against the drum will overcome the back pressure in the cylinder 41, and cause these members to rotate in a counterclockwise direction, as viewed in Fig. 3, as permitted by the slot 36. As the lug 60 and roller 61 are moved in a counterclockwise direction, this will permit the link 58 to drop and the plunger 56 to be retracted from the cylinder 17, thus relieving the pressure therein and releasing to some extent the brake shoes 13 and 14. This relieves the braking pressure upon the drum surface 12, and will permit freer turning of the wheels. At the same time the latch 27 will be withdrawn from below the plunger 25, thus closing the port 24ª, the plunger being forced downwardly by pressure entering above the plunger 25 through the duct 30, and the plunger will remain depressed as long as pressure is applied upon the brake pedal. The braking pressure effected through the cylinder 17 will, therefore, be kept at the highest possible point just short of locking the wheels until the speed of the car has been sufficiently retarded, at which time the operator removes his foot from the brake pedal. This will release the pressure entering the valve housing through the duct 22, and the spring 27ª will thereupon raise the plunger 25 and open the port 24ª, thus permitting release of pressure in the cylinder 17 and also permitting the latch 27 to again seat itself below the plunger 25 and restore the parts to their original positions for a subsequent braking operation.

It will be understood that the tension of the spring 50 and the dimensions of the plunger 42 will be so proportioned as to initiate movement of the friction shoes 31 and 32 by the drum attached to the wheel when the rotation of the wheel has been slowed to the desired point. This will preferably be just prior to the locking of the wheels.

The brake shoes 13 and 14 have attached thereto a spring 65, and the members 31 and 32 have attached thereto a spring 66, which springs serve to contract these members upon release of pressure in the cylinders 17 and 40, respectively.

Figure 4:
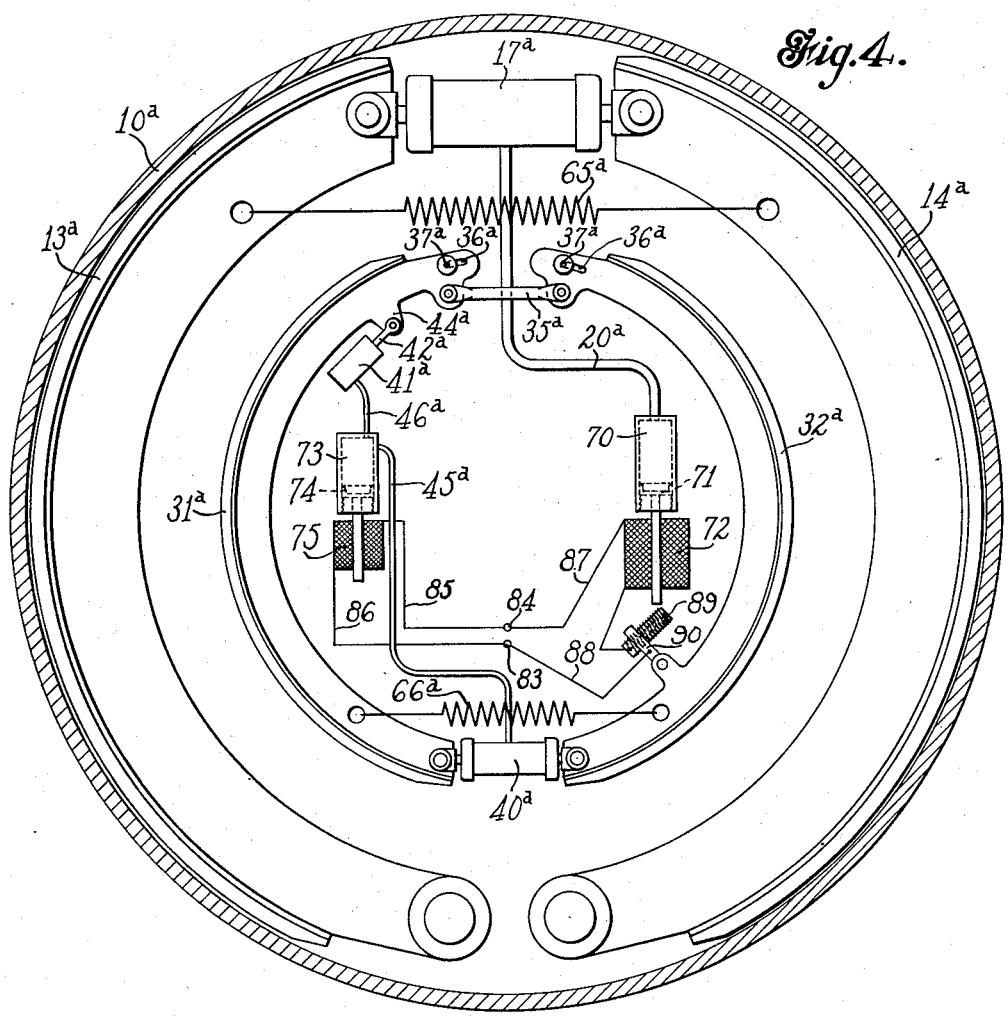
Fig. 4 is a view similar to Fig. 1, showing a modified form of braking means.
Figure 5:
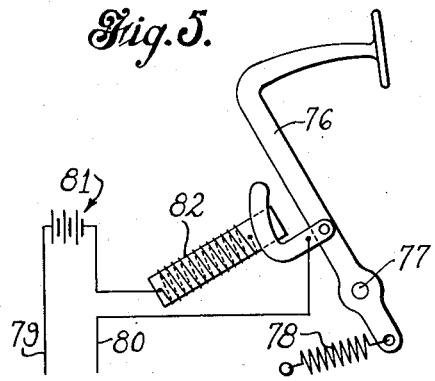
Fig. 5 is a detail view of the brake control pedal used with the modification shown in Fig. 4.

In Figs. 4 and 5 of the drawings, I have shown a modified form of my invention which is designed to be operated electrically. The principle of operation is substantially the same as that in the modification above described, and many of the operating parts are also the same. In this construction there is secured to the wheel the drum 10ª, similar in form to the drum 10, with which cooperate the brake shoes 13ª and 14ª and the friction members or shoes 31ª and 32ª. The brake shoes are expanded by means of pressure fluid in the cylinder 17ª, which corresponds in construction to the cylinder 17 already described, and the lower ends of the friction shoes 31ª and 32ª are expanded by pressure fluid in the cylinder 40ª connected to the lower ends of the bands. The upper ends of the shoes 31ª and 32ª are connected by a link 35ª, and in the ends of these shoes are provided slots 36ª within which are pins 37ª secured to a fixed part of the vehicle. The cylinder 41ª is secured to a fixed part of the vehicle, and is similar in construction to the cylinder 41, and is connected to the shoe 31ª by means of the lug 44ª and plunger 42ª.

The cylinder 17ª is connected by a duct 20ª to a cylinder 70, within which operates a plunger 71 actuated by a solenoid 72. The cylinders 70 and 17ª, together with the duct 20ª, form a closed circuit or system which will be filled with fluid.

Likewise the cylinders 40ª and 41ª are connected through ducts 45ª and 46ª with a cylinder 73, in which operates a plunger 74 actuated by a solenoid 75, the cylinders 40ª and 41ª and 73, with the communicating ducts 45ª and 46ª, forming a second closed system or circuit which will be filled with fluid.

The brake pedal is shown diagrammatically at 76, the pedal being pivoted at 77 and provided with the resisting spring 78. Pressure upon the pedal 76 is adapted to close the circuit through the conductors 79 and 80, and battery 81, the circuit being closed through a rheostat 82, so that the greater the depression of the pedal the less will be the resistance of the portion of the rheostat in the circuit, and a stronger current will be delivered through the conductors 79 and 80. These conductors lead to the binding posts 83 and 84, shown in Fig. 4. From these binding posts conductors 85 and 86 lead to the solenoid 75, and another pair of conductors 87 and 88 lead to the solenoid 72. In the line 88 is a rheostat 89, with which cooperates an arm 90 secured to the band 32ª, whereby when this band is rotated in a counterclockwise direction the arm 90 will travel along the rheostat and place a greater resistance in the circuit to the solenoid 72.

The brake shoes 13ª and 14ª and the friction shoes 31ª and 32ª are provided with the contracting springs 65ª and 66ª to restore these shoes to their inoperative position when no pressure is present in the cylinders 17ª and 40ª.

The operation of this modification of my device is as follows: The parts are shown in Fig. 4 in an inoperative position. If the vehicle is moving and it is desired to apply the brakes, the operator presses downwardly the brake pedal 76, thus initiating a current in the lines 79 and 80, and energizing the solenoids 72 and 75 through the circuits 85, 86 and 87, 88. This causes the plunger 71 to be raised in the cylinder 70, and thus place the fluid therein under pressure, which pressure will be transmitted to the cylinder 17ª and apply the brake shoes 13ª and 14ª to the cooperating drum. At the same time the energization of the solenoid 75 will raise the plunger 74, and the pressure upon the fluid in the cylinder 73 will be transmitted through the ducts 45ª and 46ª to the cylinders 40ª and 41ª. The pressure in the cylinder 40ª will expand the friction shoes 31ª and 32ª against their cooperating drum, and will effect a resisting pressure behind the piston 42ª to resist the tendency of these shoes to rotate. This pressure is so regulated that just prior to the stopping of the wheel the kinetic friction between the shoes 31ª and 32ª and the cooperating drum will overcome the pressure in the cylinder 41ª, and the shoes will rotate in a counterclockwise direction, as permitted by the slots 36ª. This rotation of the shoes causes the arm 90 to travel outwardly over the rheostat 89, thus placing greater resistance in this circuit and weakening the current in the coil of the solenoid. This causes the piston 71 to drop and thus relieves the pressure in the cylinder 17ª so that the wheels will not be locked. If the wheels begin to accelerate due to release of the brake pressure, the members 31ª and 32ª will be released, and they will return to their former position due to pressure in the cylinder 41 as long as the foot of the operator is upon the brake pedal, and the arm 90 of the rheostat will move inwardly thereover and thus again raise the plunger 71 to expand the brake shoes 13ª and 14ª.

It will be obvious that in both forms of my invention I have provided braking means which will exert full braking pressure upon the wheels to stop the vehicle, but will at all times be prevented from locking the wheels and causing them to slide or skid. Thus the maximum braking effect will be produced to stop the vehicle in the shortest possible time, as it is a well-known fact that the maximum braking effect is secured when the friction applied to the brake drums is just short of that force which is necessary to lock them against rotation. Moreover, the devices do not depend on centrifugal action, but rather on the force of static and kinetic friction, and are relatively simple in construction and at the same time positive and effective in operation.

While I have shown and described some preferred embodiments of my invention, it will be understood that it is not to be limited to all of the details shown, but is capable of modification and variation within the spirit of the invention and within the scope of the appended claims.

What I claim is:

1. In a brake mechanism for a rotating member, brake means adapted to be frictionally engaged with said member to retard rotation thereof, means frictionally engaged with said member upon application of the brake means to prevent the locking of said member against rotation by the brake means, and means normally resisting movement of said frictionally engaged means by said member.

2. In a brake mechanism for a rotating member, brake means adapted to be frictionally engaged with said member to retard rotation thereof, and means adapted to be engaged with said member upon application of the brake means, said means being normally stationary with respect to said rotating member but moved thereby prior to the locking thereof to prevent such locking by the brake means.

3. In a brake mechanism for a rotating member, means adapted to be frictionally engaged with said member to retard rotation thereof, and normally stationary means actuated by kinetic friction with said member prior to the locking thereof against rotation to relieve said frictional engagement of said first-named means.

4. In a brake mechanism for a rotating member, means adapted to be frictionally engaged with said member to retard rotation thereof, and normally stationary means actuated by kinetic friction with said member upon retardation of rotation thereof to relieve said first-named frictional engagement and prevent locking thereof against rotation by said first-named means.

5. In a brake mechanism for a rotating member, braking means, means for engaging said braking means frictionally with said member to retard rotation thereof, means for releasing said braking action immediately prior to the locking of said member against rotation, said releasing means comprising an element normally free from engagement with said member but frictionally held against said member when the brakes are applied and moved by kinetic friction therewith prior to the locking thereof by the braking means.

6. In a brake mechanism for a rotating member, braking means, means for engaging said braking means frictionally with said member to retard rotation thereof, means for releasing said braking action immediately prior to the locking of said member against rotation, said releasing means comprising an element frictionally held against said member when the brakes are applied but normally free from engagement with said member, and said element being designed to be moved by its engagement with said member upon predetermined retardation of the rotation thereof.

7. In a brake mechanism for a rotating member, a brake drum secured to said member, a brake shoe adapted to be frictionally engaged with said drum to retard rotation of said member, a friction shoe, means for moving said friction shoe against a part of said member upon application of said brake shoe, means normally holding said friction shoe against rotation, said means being overcome upon predetermined retardation of rotation of said member to permit the friction shoe to move therewith, and means actuated by movement of said friction shoe to relieve the engagement of the brake shoe.

8. In a brake mechanism for a rotating member, a brake drum secured to said member, a brake shoe adapted to be frictionally engaged with said drum to retard rotation of said member, a friction shoe, means for moving said friction shoe against a part of said member upon application of said brake shoe, means normally holding said friction shoe against rotation, said means being overcome upon predetermined retardation of rotation of said member to permit the friction shoe to move therewith, means actuated by movement of said friction shoe to relieve the engagement of the brake shoe, and means to release said friction shoe from engagement with said member at the termination of the braking operation.

9. In a brake mechanism for a vehicle wheel, a brake drum secured to said wheel, a brake shoe, means for frictionally engaging said brake shoe with said drum to retard rotation of the wheel, means for releasing said braking action prior to the locking of the wheel against rotation, said means comprising a normally stationary friction member, means for effecting frictional engagement of said member with a part of said drum upon application of the brake shoe, means effecting movement of said member upon predetermined retardation of rotation of the drum, and means actuated by movement of said member to relieve the engagement of the brake shoe with the drum.

10. In a brake mechanism for a vehicle wheel, a brake drum secured to said wheel, a brake shoe adapted to be frictionally engaged with said drum to retard rotation of the wheel, actuating means to set said shoe against the drum, a friction member adapted to be frictionally engaged with a part of said drum, means controlled by the application of the brake shoe to effect such engagement of said friction member, means to hold said member against movement prior to a predetermined retardation of rotation of said drum by the brake shoe and thereafter permitting movement of the member, and means actuated by movement of the member to relieve the frictional engagement between the brake shoe and the drum.

11. In a brake mechanism for a vehicle wheel, a brake drum secured to said wheel, a brake shoe adapted to be frictionally engaged with said drum to retard rotation of the wheel, actuating means to set said shoe against the drum, a friction member adapted to be frictionally engaged with a part of said drum, means controlled by the application of the brake shoe to effect such engagement of said friction member, means to hold said member against movement prior to a predetermined retardation of rotation of said drum by the brake shoe and thereafter permitting movement of the member, means actuated by movement of the member to relieve the frictional engagement between the brake shoe and the drum, said holding means comprising a plunger secured to the member, a cylinder within which said plunger operates, and means for introducing fluid pressure to said cylinder.

12. In a braking mechanism for a vehicle wheel, a drum secured to said wheel, a brake shoe adapted to be frictionally engaged with said drum, means to relieve the pressure of said brake shoe against said drum upon predetermined retardation of the rotation of the wheel, said means comprising a member frictionally engaged with a part of said drum when the brake is applied and controlled by the force of kinetic friction between said member and drum.

13. In a braking mechanism for a vehicle wheel, a drum secured to said wheel, a brake shoe adapted to be frictionally engaged with said drum, means to relieve the pressure of said brake shoe against said drum upon predetermined retardation of the rotation of the wheel, said means comprising a member frictionally engaged with a part of said drum when the brake is applied, means to normally prevent movement of said member, and said means being overcome by the force of kinetic friction between said member and drum prior to the locking of the wheel to permit movement of said member.

14. In a brake mechanism for a vehicle wheel, a brake drum secured to said wheel, a brake shoe adapted to be frictionally engaged with said drum, a fluid pressure actuated device for effecting such engagement, means admitting fluid under pressure to said device, a friction shoe adapted to be engaged with a part of said drum, fluid pressure means for effecting such engagement, means introducing fluid under pressure to said means upon the introduction of fluid pressure to the brake shoe actuating means, means normally holding said friction shoe against movement but permitting movement thereof by rotation of said drum prior to the locking of the wheel by the brake shoe, and means controlled by the movement of said friction shoe to cut off the supply of fluid pressure to said brake shoe actuating means.

15. In a brake mechanism for a vehicle wheel, a brake drum secured to said wheel, a brake shoe adapted to be frictionally engaged with said drum, a fluid pressure actuated device for effecting such engagement of said shoe, means admitting fluid under pressure to said device, a friction member adapted to be engaged with a part of said drum, fluid pressure means for effecting such engagement, means introducing fluid under pressure to said means upon the introduction of fluid pressure to the brake shoe actuating means, means normally holding said friction member against movement but permitting movement thereof by rotation of said drum prior to the locking of the wheel by the brake shoe, means controlled by the movement of said member to cut off the supply of fluid pressure to said brake shoe actuating means, and means also actuated by the movement of said member to reduce the pressure in said brake shoe actuating means and reduce the braking action of the brake shoe.

16. In a vehicle brake means, a vehicle wheel, a drum secured to said wheel, a brake shoe, means for frictionally engaging said shoe with the drum to retard rotation of the wheel, a friction member, means for effecting engagement between said friction member and a part of said drum upon application of the brake shoe, said member being normally held against rotation, means to limit the rotation of said member by the drum, said member being moved by engagement with said drum upon predetermined increase of the force of kinetic friction between the member and drum, means effective upon movement of the member to relieve the pressure of the brake shoe upon the drum, and means to return said member to its original position upon the decrease of kinetic friction between said member and drum.

17. A braking device for a vehicle wheel having a brake drum secured thereto, a brake shoe, a fluid pressure actuated device for applying said brake shoe frictionally against the drum, a friction member, a fluid pressure operated device for applying said member against a part of the drum upon application of the brake shoe, means controlled by movement of said member to release application of the brake shoe, fluid pressure means for normally holding said friction member against movement, and means for admitting fluid pressure simultaneously to all of said fluid pressure devices.

18. A braking means for a vehicle wheel having a brake drum secured thereto, a brake shoe, means for applying said brake shoe frictionally against the drum, a friction member, means for applying said member against a part of the drum, means actuated by said member to release application of the brake shoe, means normally resisting movement of said member, said means being arranged to be overcome by an increase in friction between said member and drum, and means for simultaneously actuating said brake shoe applying means, said friction member applying means, and the means resisting the action of said friction member.

19. A braking means for a vehicle wheel having a brake drum secured thereto, a brake shoe, means for applying said brake shoe frictionally against the drum, a friction member, means for applying said member against a part of the drum, means actuated by said member to release application of the brake shoe, means normally resisting movement of said member, said means being arranged to be overcome by an increase in friction between said member and drum, means for simultaneously actuating said brake shoe applying means, said member applying means, and the means resisting the action of said member, and means for effecting release of said member upon release of said brake shoe.

20. A braking device for a vehicle wheel having a brake drum secured thereto comprising a brake shoe, a fluid pressure actuated device for applying said shoe frictionally against the drum, a friction member, and fluid pressure operated devices for applying said friction member against a part of the drum upon application of the brake shoe, means controlled by movement of said member to release application of the brake shoe, a fluid pressure actuated device for normally holding said member against movement, and electrically operated means for setting up fluid pressure in said fluid pressure actuated devices.

RUSSELL B. STODDARD.